Oct. 5, 1937.  A. E. ELLINGER  2,094,777
MECHANISM FOR SELECTIVELY CONTROLLING THE ANGULAR MOVEMENT OF A SHAFT
Filed April 11, 1929  4 Sheets-Sheet 1
Fig. 1.
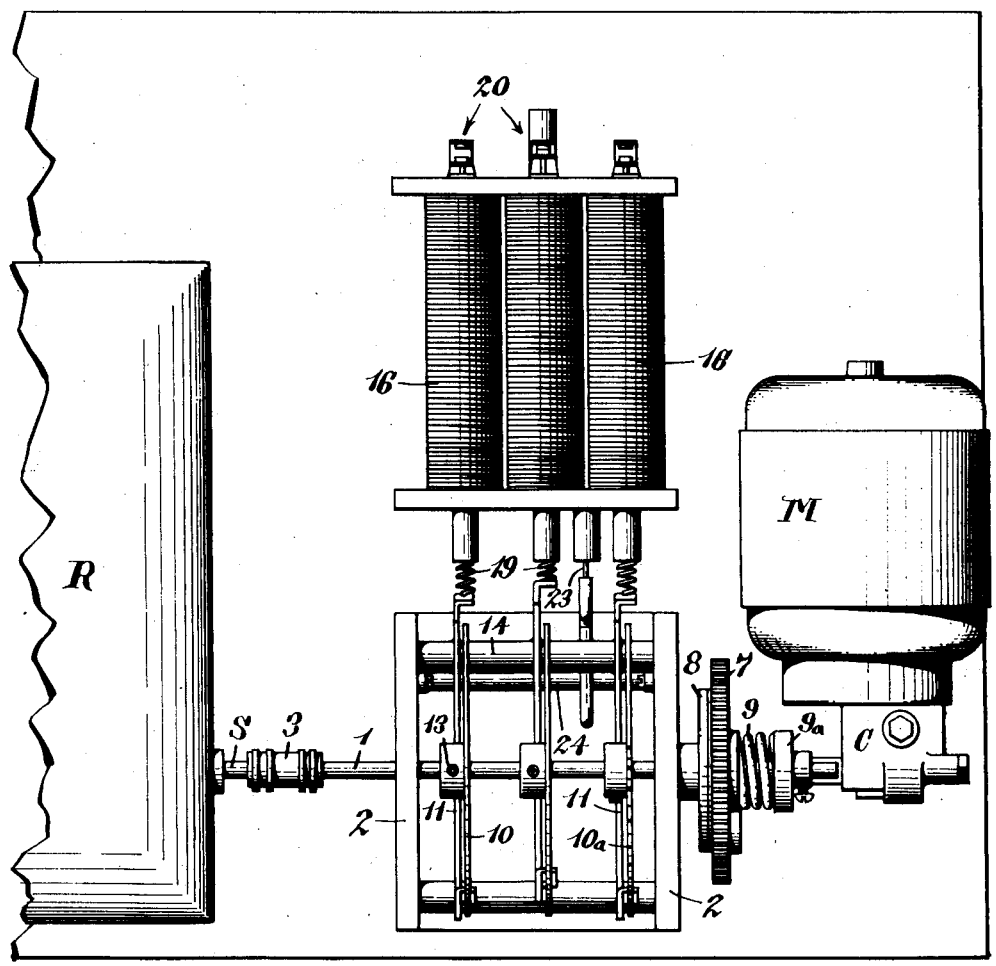
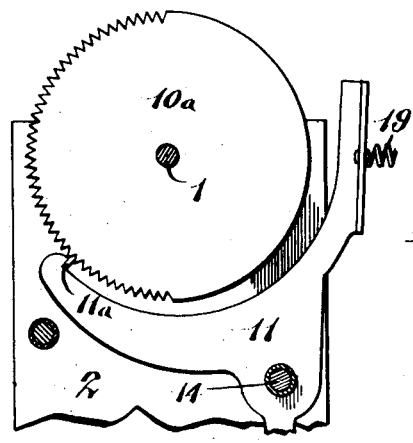
Fig. 6.
Inventor
Albert E. Ellinger
By
Popp and Powers
Attorney Oct. 5, 1937. A. E. ELLINGER 2,094,777
MECHANISM FOR SELECTIVELY CONTROLLING THE ANGULAR MOVEMENT OF A SHAFT
Filed April 11, 1929 4 Sheets-Sheet 2
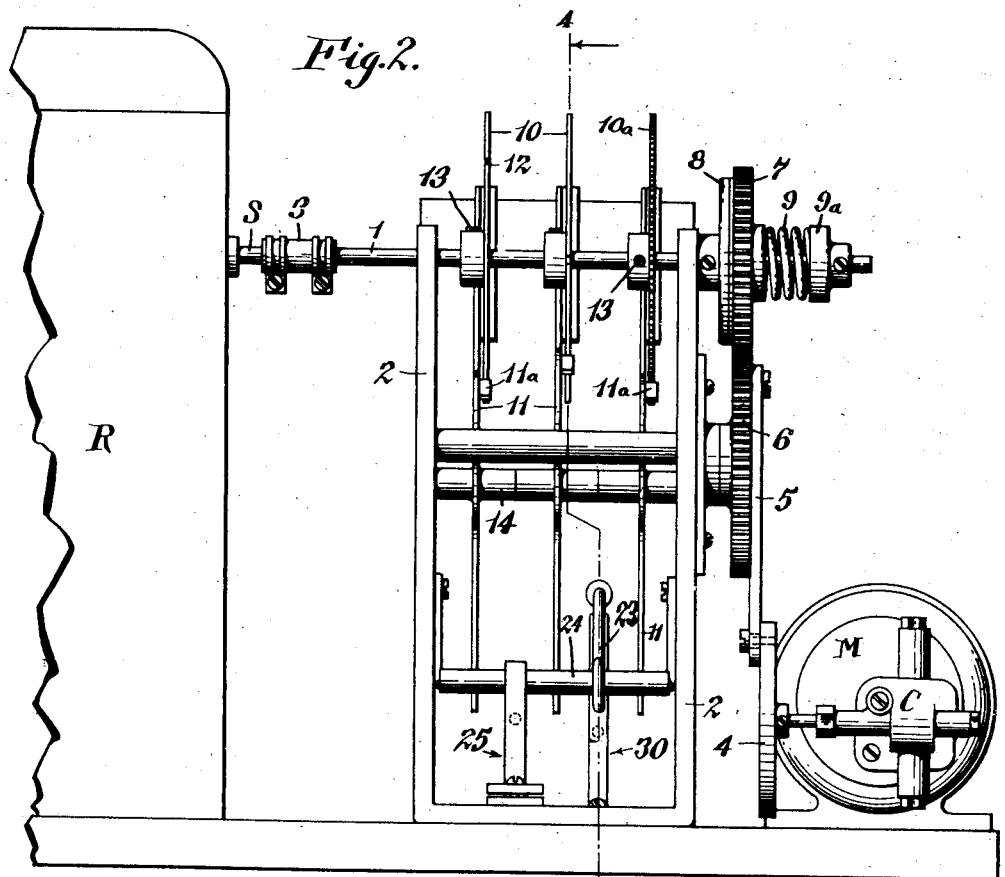
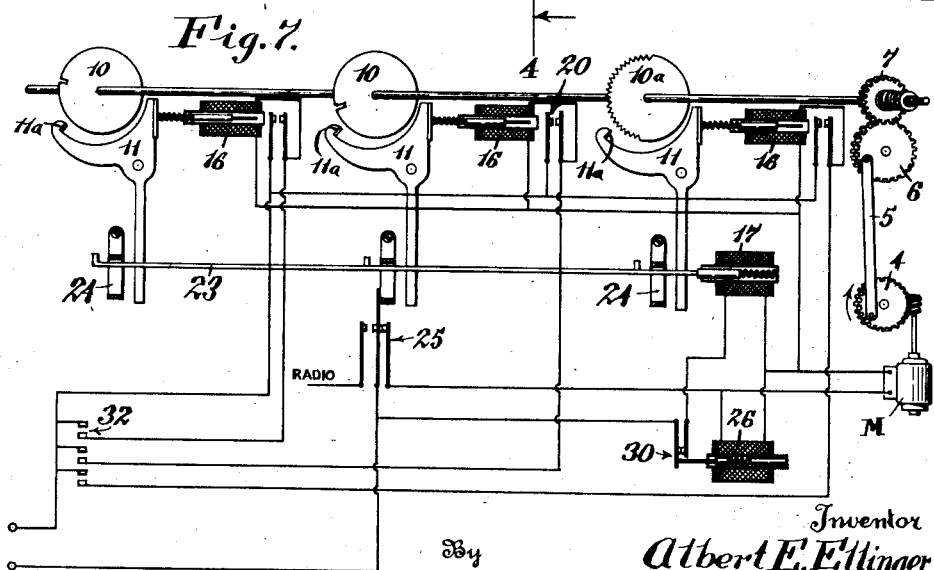
Inventor
Albert E. Ellinger
Popp and Powers
Attorney Oct. 5, 1937.  A. E. ELLINGER  2,094,777
MECHANISM FOR SELECTIVELY CONTROLLING THE ANGULAR MOVEMENT OF A SHAFT
Filed April 11, 1929   4 Sheets—Sheet 3
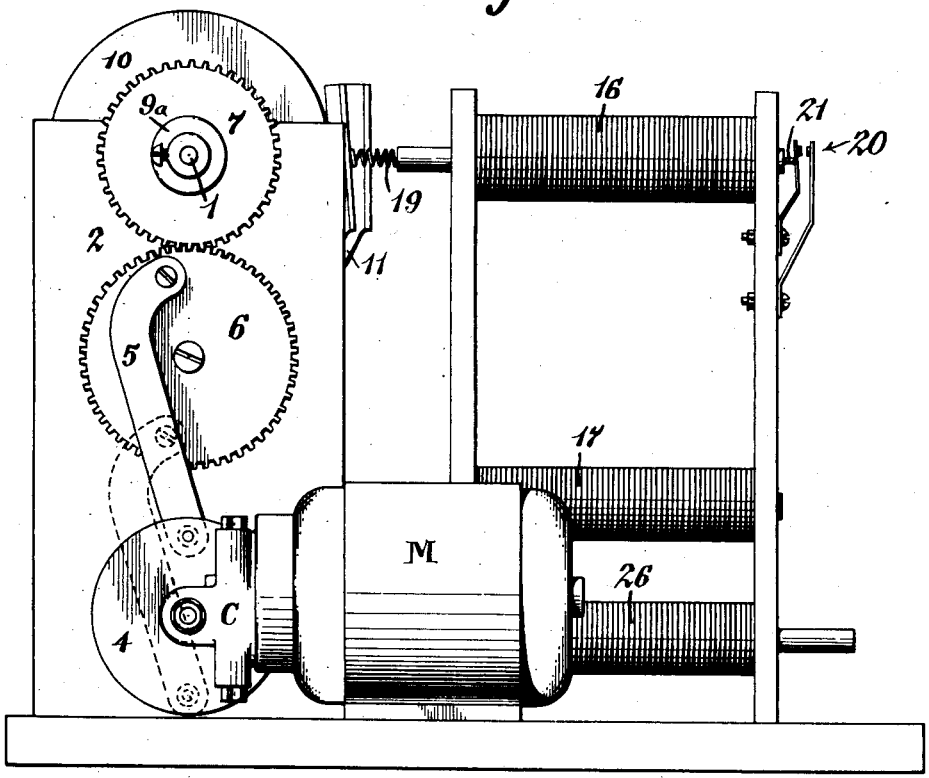
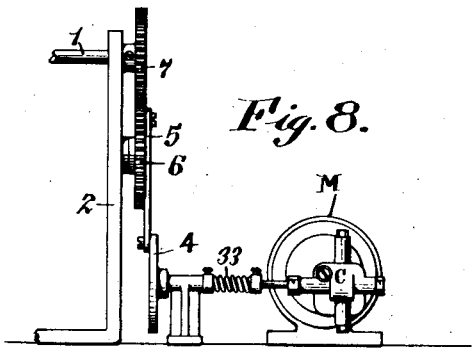
Inventor
Albert E. Ellinger
By  Popp and Powers
Attorney

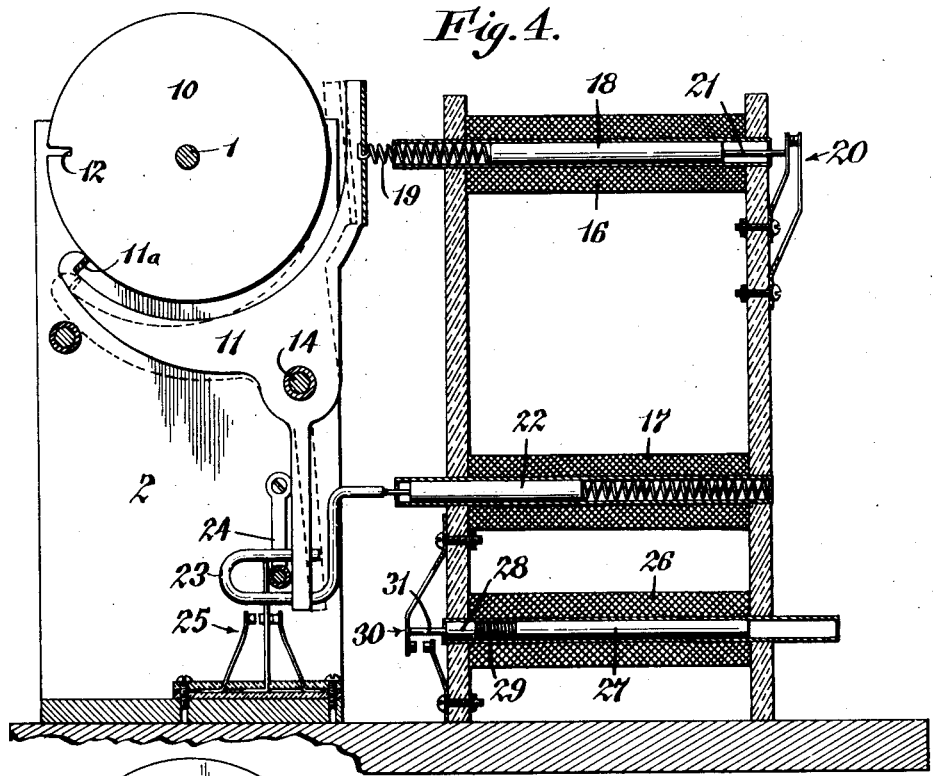
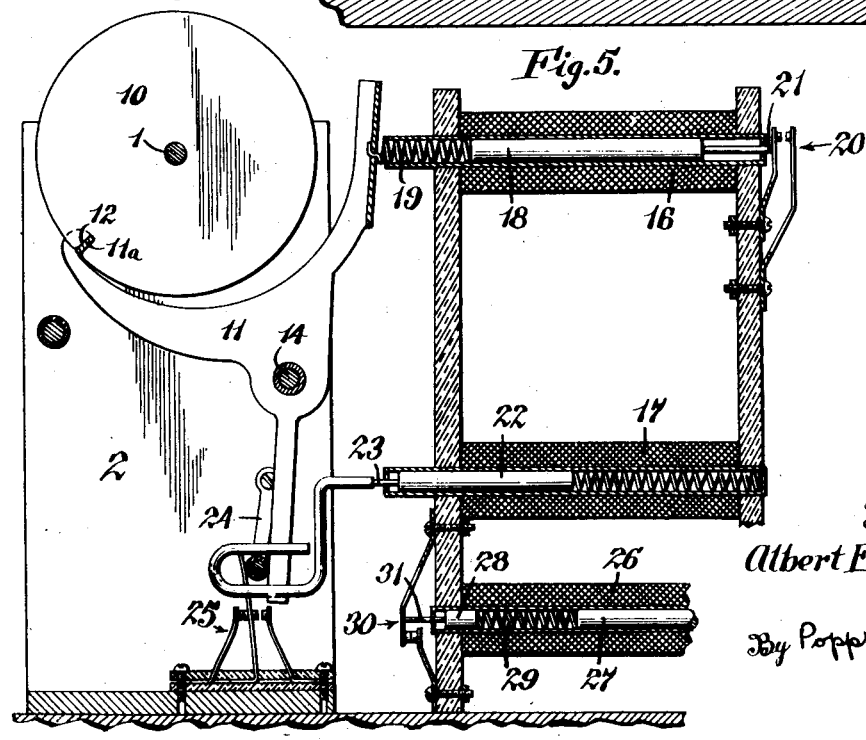

Patented Oct. 5, 1937

2,094,777

UNITED STATES PATENT OFFICE 2,094,777

MECHANISM FOR SELECTIVELY CONTROLLING THE ANGULAR MOVEMENT OF A SHAFT

Albert E. Ellinger, Snyder, N. Y., assignor to Morris Goldstein, Buffalo, N. Y.

Application April 11, 1929, Serial No. 354,375

1 Claim. (Cl. 192—142)

This invention relates to a mechanism for selectively controlling the angular movement of a shaft or a part operatively connected therewith. More particularly the invention proposes improvements in a mechanism of the type shown in my copending application Serial Number 340,759. Generally stated, both mechanisms include a shaft mounted for angular movement, a motor for driving the shaft, a series of independently operable latching means for said shaft, each being adapted to stop it at some predetermined angular position and a corresponding series of push-button switches for controlling the operation of the motor and the latching means.

The principal object of the invention is to provide means for oscillating the shaft or a part operatively connected to it, between certain angular limits and for automatically stopping the shaft at any one of a number of predetermined positions within such limits.

Another object of the invention is to provide a control arrangement wherein any one of a number of desired positions may be obtained simply by operating the corresponding one of a series of switches, the arrangement being such as to permit the operating switch to be released without affecting the ordered operation of the mechanism.

A further object is to incorporate in a mechanism of this type means for effecting the operation of a switch which controls the operation of any separate or associated mechanism when the desired position is reached.

While the mechanism is generally useful for a variety of purposes, it is illustrated in the accompanying drawings as applied to a radio receiving set for controlling the tuning of the set to any of a predetermined number of wavelengths or kilocycles. By choosing the wavelengths of various radio broadcasting stations and adjusting the mechanism for controlling the movement of the tuning elements of the set to the various positions corresponding to such wavelengths, any desired station may thereafter be automatically tuned in simply by operating the proper selector switch.

Embodiments of the invention are illustrated in the accompanying drawings, wherein:

Figure 1 is a top plan view of the mechanism as applied to a radio set.

Figures 2 and 3 are front and side elevations respectively of the same.

Figure 4 is a sectional view, partly in elevation, along line 4—4 of Fig. 2, the initial position of the selector finger being shown in dotted lines while the position to which it is initially moved when the selector coil is energized is shown in full lines as are the other parts. In this figure the selector and cut-out coils are energized and the restoring coil deenergized.

Figure 5 is a corresponding sectional view, partly in elevation, with the selector finger shown in final or latching position. In this figure all of the coils are deenergized.

Figure 6 is a fragmentary elevation of the step-by-step latching finger and cam.

Figure 7 is a schematic view of the mechanism and the control arrangement therefor.

Figure 8 is a fragmentary front elevation of a modified form of connection between the motor and the shaft.

Figure 9 is a section of the connecting spring utilized in the arrangement shown in Fig. 8.

The shaft whose movement is to be controlled, is indicated at 1 and, as shown, is mounted on suitable bearing standards 2. It will, of course, be understood, that by controlling the movement of the shaft 1, the control of any part operatively connected to the shaft is thereby automatically effected.

Since the mechanism, as herein shown, is applied to a radio set R, one end of the shaft, therefore, is connected through the coupling 3 to the shaft S upon which the tuning elements of the radio set R may be mounted. Obviously an angular movement of the shaft will effect a similar movement of the tuning elements and hence to tune the set it is only necessary to control the movement of the shaft 1.

The movement of the shaft 1 may, of course, be effected in any suitable manner and by any suitable means. An electric motor drive is perhaps the most practical and is herein used, being indicated at M. The motor M may be connected to rotate the shaft 1 but in view of the fact that the tuning condensers of a radio set are ordinarily limited to a movement within the tuning range which generally is 180° more or less, it is preferred to arrange the drive so as to oscillate the shaft 1 within limits sufficient to cover the tuning range. The oscillation of the shaft may, of course, be accomplished by reversing the motor but it preferably is accomplished by arranging the motor for rotation in one direction and connecting it to the shaft through a suitable translating device which effects an oscillation of the shaft from the rotation of the motor. The translating device illustrated consists of a crank wheel 4, an idle crank gear 6 and an intermediate connecting crank 5. The crank wheel 4 is driven from the motor M through a conventional gear reduction mechanism which is generally indicated by a showing of its casing C while the crank gear 6 drives a gear 7 which is loosely mounted on the shaft 1. It may be pointed out that the crank connection radius of the crank gear 6 is made larger than the corresponding radius of the crank wheel 4 so that a rotation of the latter will effect an oscillation of the former. It may also be pointed out that in this type of connection, the angle of oscillation is somewhat limited, an angle of 145° to 150° being most practical, and, in order to move the shaft 1 throughout the tuning range which, as stated, generally is in the neighborhood of 180°, it is necessary to make the shaft gear 7 proportionally smaller in diameter than the idle crank gear 6.

The connection between the motor M and the shaft 1 is completed by a friction clutch mechanism which includes the loosely mounted shaft gear 7 as one of its elements.

The clutch mechanism also includes a member 8 which is fixed to the shaft and against which the shaft gear 7 is resiliently pressed by a spring 9, the spring being held in compression between the gear 7 and a shoulder 9a which, also, is fixed to the shaft. A friction disc preferably is interposed between the clutch parts 7 and 8. Obviously as the motor rotates the crank wheel 4, the crank gear 6 will be turned back and forth between the limits of its movement thereby effecting a similar but greater angular movement of the shaft 1 through the shaft gear 7.

The invention, as stated, contemplates locking the shaft against movement at any one of a number of chosen or predetermined positions. For this purpose a plurality of latching means, corresponding in number to the number of predetermined positions desired, are provided and arranged for selective operation to lock or latch the shaft against further movement when it reaches the predetermined position desired.

The latching means include a series of cams 10 mounted to oscillate with the shaft 1 and a corresponding series of latching elements or fingers 11 mounted adjacent the shaft 1. Only a few cams 10 and latching elements 11 are herein shown for the sake of clearness but it is to be understood that any number may be used as is found expedient. Each element 11 is adapted for independent pivotal movement into engagement with the periphery of its corresponding cam 10 and for latching engagement with a radial surface 12 or the like which may be formed in the cam at some point in its periphery, this point being located in accordance with some desired predetermined position of the shaft 1. While each cam 10 will ordinarily have but one radial latching surface 12, one or more of them may, when desired, be formed with a plurality of such surfaces either for the purpose of determining a number of desired predetermined positions or for the purpose of traversing the entire range of movement step-by-step. The cam indicated herein at 10a is illustrative of the step-by-step control.

It will be readily appreciated that various causes may, from time to time, render it desirable or necessary to change any one or more of the predetermined positions at which the shaft is stopped by the latching means. Generally speaking, this may be accomplished by adjusting either the cams 10 or the latching elements 11 angularly about the shaft 1. The adjustment of the cams affords the simplest means for securing this result in the present embodiment and, to this end, each cam is fixed to the shaft solely through the agency of a set screw 13 which naturally permits quick adjustment.

The latching elements 11 preferably are pivotally mounted intermediate their ends, upon a rod 14 which is suitably supported at opposite ends by the bearing standards 2. The upper end of each element is forked to extend along the periphery of its particular disc in both directions, the fork having a tang 11a to facilitate latching engagement with the radial surface 12 of its corresponding cam. The pivotal latching movement of each element is effected by individual solenoids 16 while the pivotal unlatching movement of all the elements is effected by a common solenoid 17.

The solenoids 16, hereinafter termed the selector coils, are mounted in any suitable manner. The bore of each element is provided with a projecting brass sleeve within which a sliding plunger 18 is arranged. The plunger 18 normally extends away from the center of the coil whereby when the coil is energized, the plunger is pulled toward the center, the resulting movement being utilized to effect the latching movement of the corresponding latching element. To this end, the plunger of each selector coil is connected to its respective latching element 11 by any suitable means such as the spring 19. The resulting movement of any particular selector coil plunger 18 is also utilized to effect the closing movement of a switch 20 which is mounted at one end of the coil, one switch being provided for each coil. The contacts of the switches 20 are spring mounted and arranged so that one contact of each switch is aligned with, and adapted to be moved by, a rod 21 carried by the plunger 18 of its particular selector coil.

The solenoid 17, hereinafter referred to as the restoring coil, is suitably mounted and similarly provided with a projecting brass sleeve and with an inner sliding plunger 22 which is normally offset from the center of the coil. The movement of the plunger 22 is, as stated, utilized to effect the unlatching movement of the latching elements, the extent of this movement being limited by a suitable stop. For this purpose the plunger is connected to the elements 11 through a rod 23 and U-shaped member 24. The free ends of the U-shaped member 24 are pivotally mounted on the bearing standards 2 which support the latching elements while the body of the U-shaped member 24 loosely engages the latching elements adjacent their lower ends, it being understood, of course, that the plunger rod 23 is connected to the body of the member 24.

The U-shaped member 24 is so arranged that it will be engaged by a latching element 11 and moved by such element only when the latter moves into a notch of the associated cam 10. This movement is utilized to move the central member of a single-pole double-throw switch 25 from one position—to which it is normally urged—to another thereby opening the normally closed contacts on one side and closing the normally open contacts on the other side.

The mechanism also includes a solenoid 26, hereinafter termed the cut-out coil, having a large plunger 27 and a small plunger 28, the large plunger being offset from the center of the coil and separated from the small plunger 28 by a spring 29. This arrangement is utilized to delay the opening of the contacts of a normally closed switch 30 for a very slight interval after the cut-out coil has been energized. The small plunger 28 is, therefore, provided with a rod 31 which is arranged to extend adjacent one contact arm of the switch 30 and, when properly moved, to open the contacts thereof.

In the control arrangement which is shown in Figure 7, a series of manually operable push-button switches 32 are provided, one switch for each desired predetermined position, that is to say one for each selector coil 16. Each switch 32 is connected in series with its corresponding selector coil and in parallel with the switch 20 which is controlled by that coil, the connection, as a whole, being arranged between one side of a suitable source of energy (not shown) and one side of the driving motor M. The other side of the motor is connected through the normally closed contacts of the switch 25 to the other side of power. The restoring coil 17 and the cut-out coil 26 are placed in parallel with the motor, it being noted that the restoring coil circuit includes the cut-out coil switch 30 but excludes the switch 25 which is included in the motor circuit.

When the mechanism, herein shown, is adjusted for controlling the movement of the shaft 1 to any of a number of predetermined positions, the shaft may be operated to the desired position simply by depressing the proper selector switch 32. It is evident from the arrangement shown in Figure 7 that such operation of the selector switch 32 not only energizes the corresponding selector coil 16, but at the same time also energizes the restoring coil 17, cut-out coil 26 and the motor M. The energization of the selector coil 16 will, of course, tend to pull the corresponding latching element 11 into contact with its cam 10 but this action is momentarily prevented by the restoring coil 17. The restoring coil is designed to have a much stronger pulling effect than the selector coils 16 with the result that it moves the latching element away from the cam. The restoring coil, however, remains energized for a slight interval only, its circuit being opened by the delayed acting cut-out coil 26. As soon as the restoring coil 17 is deenergized, the selector coil 16 becomes effective to move the latching element 11 into engagement with its cam 10. This movement is effective to close the switch 20 of that particular coil which being in parallel with the push-button 32 permits the latter to be released. This action of the coils 16 and 17 ordinarily occurs so quickly as to require the push-button 32 to be depressed for a very slight interval only. In the meantime the motor M angularly turns the shaft 1 and associated cams 10 between its oscillatory limits until the shaft 1 reaches the predetermined position desired at which point the radial surface 12 of the proper cam moves into engagement with the operative latching element to latch or lock the shaft in such position. The movement of the latching element 11 into the cam notch effects the opening of the normally closed contacts of the switch 25 thereby opening the circuits of the motor M, selector coil 16 and cut-out coil 26. This actuation of the switch 25 which also effects the closure of its normally open contacts, may be utilized to connect some associated circuit to power such as the circuit of the radio set as herein indicated. By so doing, the radio set will be turned on only when the desired station is tuned in while the mechanism operating circuits will, at the same time, be completely deenergized. The deenergization of the selector coil 16 will not, however, cause the associated latching element 11 to return to its initial position. This element is prevented from returning to its initial position by the friction between the element and the radial surface 12 of the engaged cam. It may be pointed out, however, that this element will be returned to its initial position upon the operation of either one of the manually operable switches 32, through the momentary restoring action of the restoring coil 17 as previously described. Hence in order to move the shaft 1 to another predetermined position, it is only necessary to operate the proper manual switch 32 whereupon the restoring coil 17 is energized to return the latched element 11 to its normal position which at the same time permits the switch 25 to return to its normal position, this switch thereby completing the circuits of the motor M, selector coil 16 and cut-out coil 26 to repeat the position selecting operation.

When it is desired to operate the mechanism step-by-step over all, or any portion of, its range of positions, it is simply necessary to depress the proper switch 32 once for each degree of movement as determined by the spacing of the notches in the step-by-step cam 10a.

As long as the movement of the shaft 1 is to be effected through the motor M, any element 11 which is latched to its respective cam 10 may be permitted to remain in such latched position. When it is desired, however, to move the shaft manually—this being permitted by the friction clutch without requiring the disengagement of the clutch parts—it is necessary to return the element to its initial position. This may be accomplished through the restoring coil 17 simply by a momentary operation of the switch 32. The manual movement of the shaft in the embodiment illustrated, to any position may be accomplished by grasping and turning the shaft or any of the associated rotatable parts. Of course, where desired, a handle may be suitably incorporated in the mechanism for this purpose.

This device is adjusted to the different positions in the same manner as the device described and claimed in the copending application noted.

It may be pointed out that in the operation of the mechanism, the motor, while deenergized at the time the shaft is locked against movement, may continue to rotate for a very short interval and thus effect a further movement of the translating device with the result of changing the relative arcs through which the cams and the translating device move. This result will, however, be corrected upon the next movement of the cams which bring the tuning elements to the end of their movement in one direction or the other. The tuning elements at this point are prevented from further movement but permit the continued movement of the translating device up to its point of reversal thereby bringing these parts into the proper relation.

The change in the relative arcs of the cams and translating device may be entirely prevented by the use of an arrangement such as that shown in Figures 8 and 9. In this arrangement the translating device is positively connected to the shaft 1 by securing the gear 7 directly to the shaft. In order to permit the motor to continue its limited rotation when the shaft and translating device are locked against rotation and the motor circuit is opened, a spring 33 is utilized to connect the crank wheel 4 of the translating device to the driven shaft of the reduction gear mechanism. It will be readily appreciated, however, that a clutch may be utilized at this point in place of the spring 33.

While the translating device as shown herein is arranged between the shaft 1 and the motor, it should be understood that it may be otherwise located. For example, it may be utilized to connect the shaft S and the shaft 1, the cams 10 in such case being rotated in one direction only. With that type of construction, it is contemplated to place the cams and associated mechanism beneath the radio set R with the crank 5 extending upwardly into the set.

Having fully described my invention, I claim:

An arrangement for controlling the angular movement of a shaft comprising a member arranged for movement with said shaft, an element pivotally mounted for movement away from said member and for movement into engagement with said member to latch said shaft at a predetermined point, a manually operable switch, a circuit controlled by said switch, means included in said circuit for moving said element away from said member and for immediately thereafter moving said element into engagement with said member and a normally closed switch in said circuit to open the same when said latching element effects the latching of said shaft at said predetermined point.

ALBERT E. ELLINGER.